July 19, 1966 R. WEINSTEIN 3,261,963
AUTOMATIC ELECTRIC FLUID HEATING APPARATUS
Filed Dec. 6, 1963 3 Sheets-Sheet 1

INVENTOR.
RICHARD WEINSTEIN
BY Albert F. Kronman
ATTORNEY

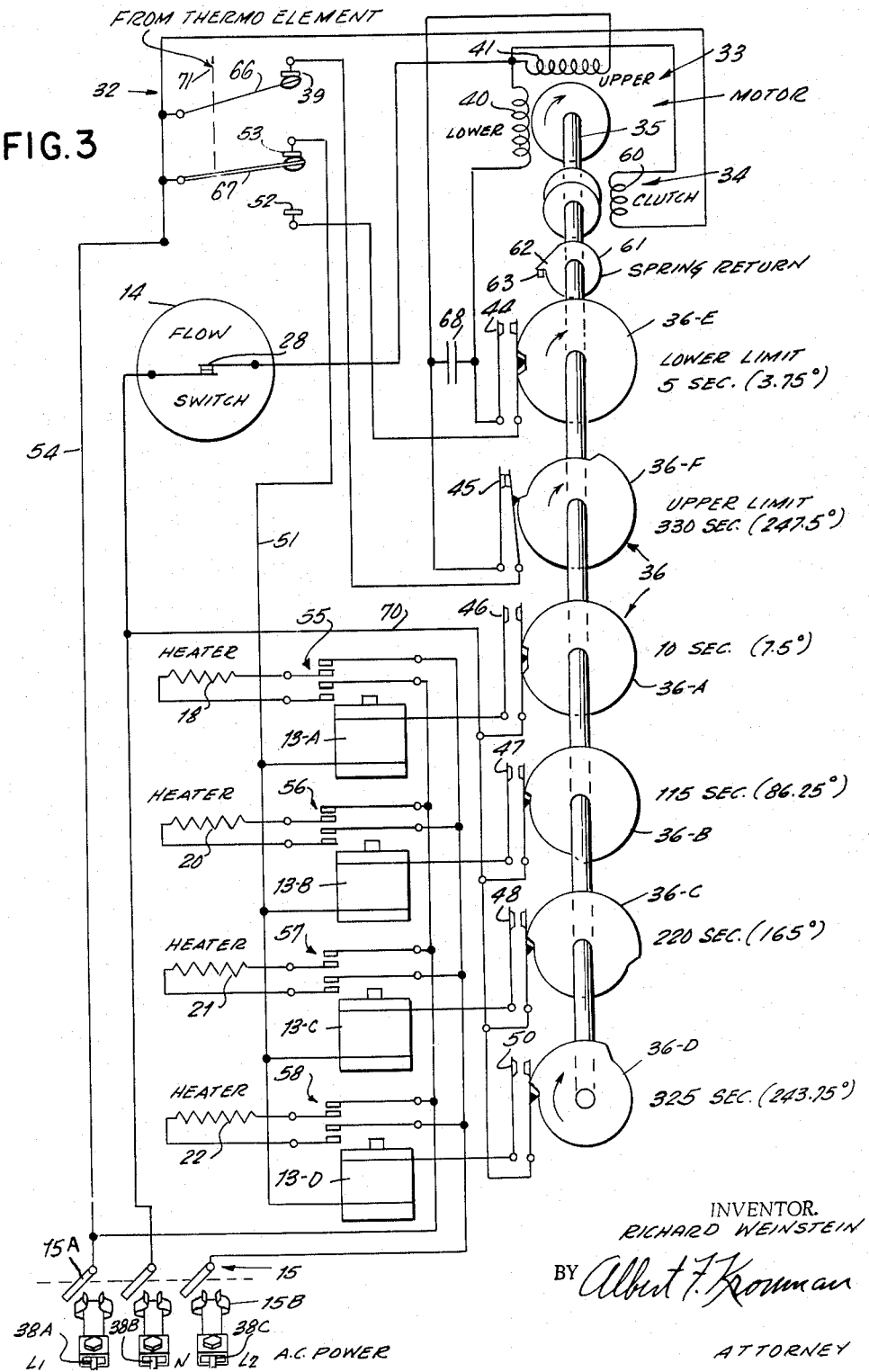

July 19, 1966  R. WEINSTEIN  3,261,963
AUTOMATIC ELECTRIC FLUID HEATING APPARATUS
Filed Dec. 6, 1963  3 Sheets-Sheet 3
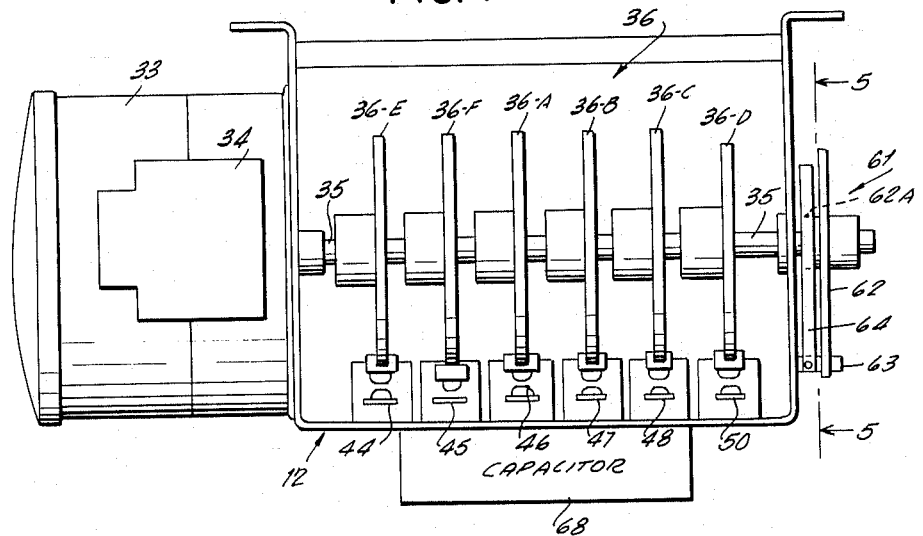
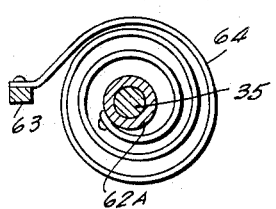
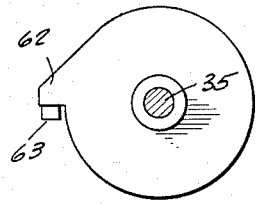
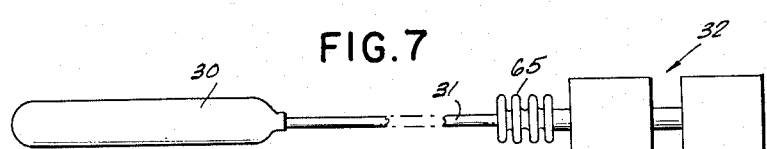
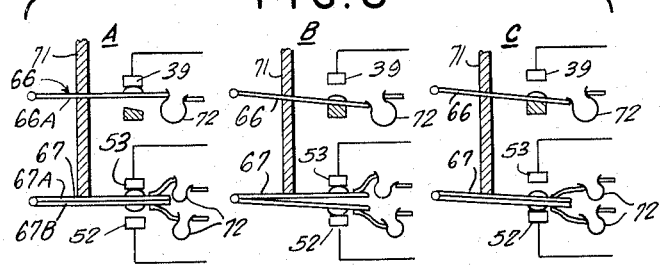
INVENTOR.
RICHARD WEINSTEIN
BY Albert F. Kronman
ATTORNEY

United States Patent Office 3,261,963
Patented July 19, 1966

3,261,963
AUTOMATIC ELECTRIC FLUID HEATING APPARATUS
Richard Weinstein, Huntington, N.Y., assignor, by mesne assignments, to Commercial Factors, Ltd., Montreal, Quebec, Canada
Filed Dec. 6, 1963, Ser. No. 328,634
5 Claims. (Cl. 219—309)

This invention relates to an automatic electric fluid heating apparatus for heating a fluid passing through a conduit. The invention has specific relation to an apparatus for heating water under controlled conditions only when the water is flowing through the heating unit.

The invention utilizes a plurality of heating elements and is designed so that it adjusts the number of heating elements which are energized in response to the heat loss of any system in which it is incorporated. The automatic heating operation is accomplished without the need of external control units positioned at remote points in a system.

Many devices have been designed which incorporate a time delay between the energizing of a plurality of heating elements. These devices do not, however, use a simple method of limiting the number of heating elements that are energized so that the power supplied is never more than the power required by the system. The present invention holds the temperature of the fluid in the system within a range of temperatures which are adjustable. The invention also provides certain novel safety features which operate in an unusual manner.

An object of the present invention is to provide an automatic electric fluid heater which can maintain fixed temperatures by indirectly sensing heating system losses and adjusting its heat output to balance those losses.

Another object of the present invention is to produce a high hot fluid output from an apparatus which occupies a very small volume.

Another object of the present invention is to provide an automatic fluid heater which requires no control wires from any outside source.

Another object of the present invention is to provide a completely self-protecting fluid heating unit. This is accomplished by insuring a minimum flow of fluid across the surface of the heating units before energizing them.

Another object of the present invention is to protect the heating units employed to heat the fluid and to prolong their useful life.

Another object of the present invention is to isolate the electrical power connection enclosure from the fluid system enclosure so that the electrical and plumbing installers need not be present at the same time to complete or service the installation.

Another object of the present invention is to provide mechanical and electrical safety means to limit the current and temperature so that all elements within the apparatus are protected.

A feature of the present invention is the use of a snap action thermostat switch hereinafter referred to as a "make-before-break" switch.

Another feature of the present invention includes a series of relays coupled between the sequential switching means and the heating units.

Another feature of the present invention includes an upper limit switching means which disconnects the power from the heater units when the temperature increases above a predetermined value.

Another feature of the present invention includes a flow switch which disconnects the power whenever the fluid flow stops or falls below a predetermined value.

The invention comprises an automatic electric fluid heating apparatus which includes a conduit through which the fluid passes while it is being heated, a plurality of electrical resistance heating units within the conduit for transferring heat to the fluid, and a temperature sensitive mechanical transducer also disposed within the conduit for sensing the temperature of the fluid. A plurality of electrical switching means are directly coupled to the transducer and a sequential switching means responsive to the temperature sensitive transducer is provided for controlling the electrical power applied to the heating units. The sequential switching means includes a motor and a plurality of cam operated contacts on a motor shaft.

The invention consists of the construction, combination and arrangement of parts, as herein illustrated, described and claimed.

In the accompanying drawings, forming a part hereof there is illustrated one form of embodiment of the invention, in which drawings similar reference characters designate the corresponding parts, and in which:

FIGURE 3 is a schematic diagram of connections showing all the electrical components, the motor, the clutch, and the six cams, four of which control the heating units and two of which control the fail-safe circuits.

FIGURE 4 is a side view somewhat enlarged of the motor, the clutch, the six cams, and the spring return unit.

FIGURE 5 is a cross-sectional view showing the spring return means and is taken along line 5—5 of FIGURE 4.

FIGURE 6 is an end view of the arrangement shown in FIGURE 4, and illustrates the stop cam which stops the six cams when the clutch is released.

FIGURE 7 is a schematic diagram showing one form of the temperature sensitive transducer which operates two control switches.

FIGURES 8A, B, C, are schematic views of the thermostat switch used in the present invention showing how it is progressively operated.

Figure 1:
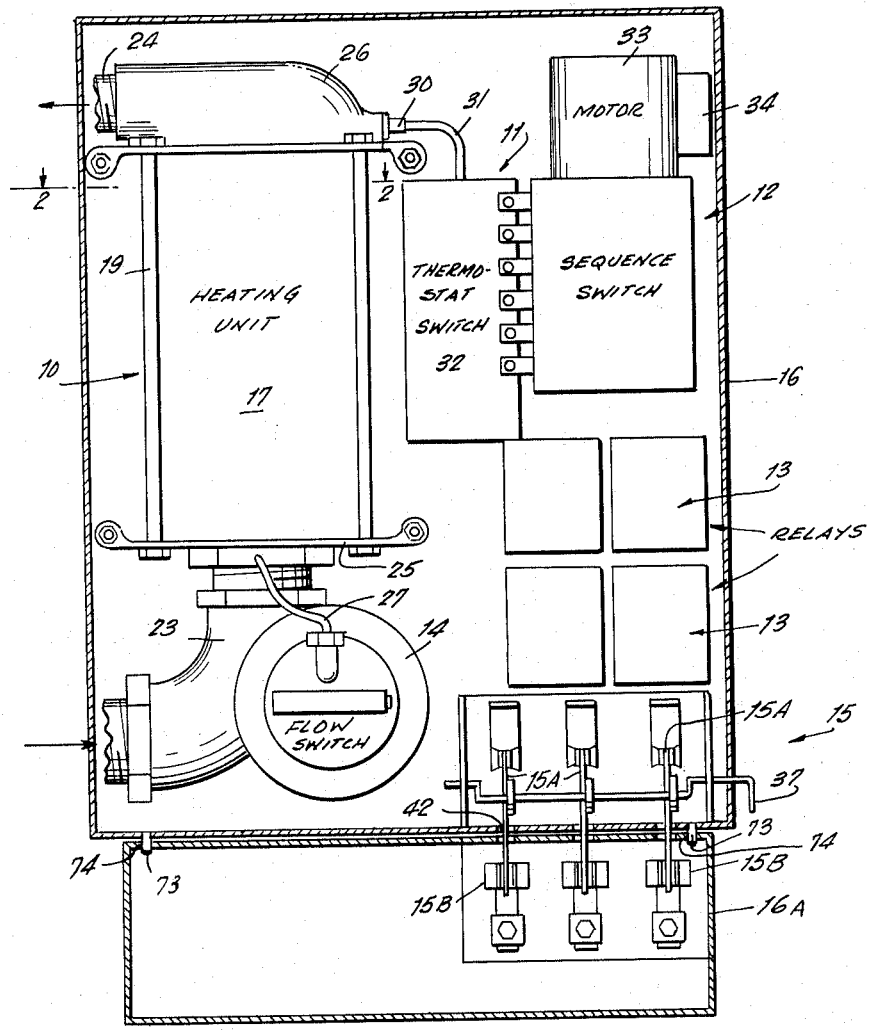
FIGURE 1 is a side view of the entire unit showing some of the major components in block form.
Figure 2:
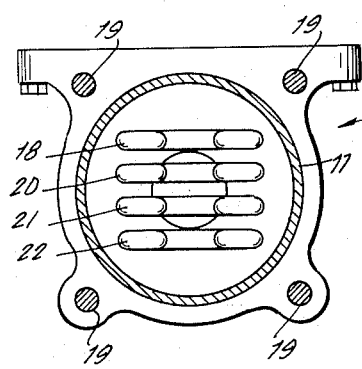
FIGURE 2 is a cross-sectional view of the heating unit taken alone line 2—2 of FIGURE 1.

Referring now to FIGURES 1 and 2, the apparatus includes a fluid heating unit 10, a thermostatic switch 11, a motor operated sequence switch with built-in clutch control 12, and a plurality of relays 13. The device also includes a flow switch 14, manually operated power switch 15, and an upper and lower enclosure 16, 16A. The lower enclosure 16A serves as a terminal box for power lines (not shown). The enclosure 16A also contains a set of receptacle clips 15B, which receive the blades 15A of knife switches 15. The blades 15A swing through slits 42 in housings 16, 16A when the switch handle 37 is thrown.

The heating unit 10 is provided with a conduit 17 in which are positioned four heating units 18, 20, 21 and 22. These units are in contact with the fluid which flows through conduit 17. Conduit 17 is covered at each end by an entrance casting 25 and an exit casting 26. A series of four rods 19 may be employed to hold the castings in position upon the conduit and form a fluid tight enclosure.

Since a large amount of power (for example 24 kilowatts) may be dissipated within the small conduit 17, a primary safety feature is a flow switch 14 which is located on the entrance side of the heating unit. The flow switch 14 basically is a differential pressure device which senses the pressure differential on either side of an orifice or constriction (not shown) located within entrance pipe 23. The flow switch 14 is divided into two chambers by a diaphragm disposed between the portions which are connected to conduit 17 and pipe 23. A relative flow of 2½ gallons per minute must be present in the system before the flow switch closes its internal switch contacts 28 (see FIGURE 3) and energizes a reversible motor 33 and a clutch 34.

The temperature of the fluid leaving the heating unit and passing through exit pipe 24 is measured by a temperature sensitive mechanical transducer 30 which is positioned within the exit casting 26 and which operates a bellows 65 through a tube 31. The bellows 65 operates a plurality of switches generally indicated at 32 in FIGURES 1, 3 and 8. The thermostat switching elements 32 are contained within a box and connections to them are made from the power lines, the relays, and the sequence cams as shown in FIGURE 3.

The complete circuit diagram of the apparatus is shown in FIGURE 3. Power is applied by means of supply conductors positioned in the lower receptacle 16A which are connected to terminals 15B. The center terminal is neutral. This power supplies all circuits within the heating device. Alignment of the knife blades 15A with clips 15B is provided by alignment pins 73 carried by the upper enclosure 16 which are received in cooperating holes 74 in the lower enclosure 16A.

The sequence switching unit 12 shown in FIGURE 1 and in detail in FIGURES 3 and 4 is turned by a reversible alternating current motor 33 which operates through a clutch 34 to turn a shaft 35 and a plurality of cams 36A–36F. The main switch 15 is operated by the usual manual switch arm 37 and when the blades 15A are swung into the housing 16 the entire unit is completely disconnected from the power source.

When switch 15 is closed a series of relay contacts, to be described later, are connected across the two high voltage lines 38A and 38C. Power line 38B is connected directly through contacts 28 of the flow switch 14 which then connects this terminal to the mid-point between two field windings 40 and 41 of the motor 33. Winding 41, when energized, turns the motor in the direction indicated by the arrows to increase the number of the heating units in operation. When current is applied to field winding 40, the motor is turned in the opposite direction to deenergize certain of the heating units and thereby decrease the heat applied to the fluid.

The circuit contains four power relays 13, each having a winding 13A, 13B, 13C and 13D. These windings are energized by the contacts 46, 47, 48, 50 operated by cams 36A, 36B, 36C and 36D. A lower limit cam 36E is secured to shaft 35 to cut off the current through field winding 40 whenever shaft 35 is returned to its zero position. This cam operates to close its contacts 44 five seconds after the motor is started. A sixth cam 36F, termed the upper limit cam, holds its contacts 45 in a normally closed position until the cam shaft 35 has been rotated a maximum amount of 247.5°. Then the cam contacts are opened and current is cut off from the upper field winding 41.

Cams 36A, 36B, 36C and 36D, are arranged to operate normally open contacts 46, 47, 48, and 50, in sequence as the shaft is turned. Contacts 46 are closed ten seconds after the motor 33 is started and connect power lines 38B to relay winding 13A. The return circuit is by way of conductor 51, normally closed contacts 52, and back-over conductor 54 to terminal 38B. This action closes the relay contacts 55 and high voltage power is applied to heater 18 from terminals 38A and 38C. In a similar manner cam 36B closes contacts 47, energizes relay winding 13B to send power to heater 20 through contacts 56. This action happens only if the motor shaft 35 continues to rotate for an elapsed time of 115 seconds.

Continued rotation of the cam shaft closes contacts 48 after 220 seconds to operate relay 13C and to close contacts 57 and energize heater 21. The same thing happens to the fourth heater 22 after 325 seconds.

One of the fail-safe features of the present invention includes a magnetic clutch 34, having a winding 60. When this winding is energized, the clutch is engaged and the motor 33 turns shaft 35. If, for any reason, the fluid flow falls below a minimum value, flow switch contacts 28 are opened and current is cut off from both the motor windings 40, 41, and the clutch winding 60, stopping the motor and releasing the clutch. When the clutch is released, a spring return device 61, with a stop arm 62 and stop 63, rotates the shaft back to its zero or starting position to open all of the contacts 44, 46, 47, 48 and 50. Details of the spring return device are shown in FIGURES 4, 5 and 6. The stop arm 62 is secured to shaft 35 and a flat portion of the arm makes contact with a stop 63 when the shaft and cams are in their start position. A stud portion 62A of the stop arm extends towards the motor end of the shaft and one end of a spiral spring 64 is secured to it. The other end of the spring may be secured to stop 63 or to any other part of the mounting bracket which holds the motor and shaft in place.

The temperature sensitive transducer element 30, which is mounted at one end of the conduit 17 may be any type of device which produces a mechanical motion proportioned to the temperature. One such device is shown in FIGURE 7 where the sensitive element 30 is a closed bulb containing mercury or any other suitable fluid. The bulb is connected by a flexible tube 31 to a bellows 65 which produces the mechanical motion. The bellows is preferably set against one or more micro-switch thermostat units 32.

The thermostat switch units 32 are shown in greater detail in FIGURE 8. In this view each movable contact blade 66, 67A, 67B, is shown coupled to a toggle spring 72 to provide a snap action when the contacts are opened or closed. In this embodiment the upper switch 66 is a simple snap switch and the lower switch 67 a make-before-break type. Other forms of snap action mechanisms can be used. In FIGURE 8A the switch blades are shown in their normal or cold position with contacts 39 and 53 closed, and contacts 52 open. As the water temperature increases, rod 71 of the transducer element 30 first opens contacts 39 and closes contacts 52, reversing the direction of the motor. This condition is shown in FIGURE 8B. If the temperature rises above a predetermined safe limit, rod 71 moves still lower and opens contacts 53, cutting off all current to the relay windings and de-energizing all the heaters. This condition is shown in FIGURE 8C.

In order to describe the operation of this device, let it be assumed that cold water is flowing through the conduit 17 (closing contacts 28) and the other components are in the position as shown in FIGURE 3. The main switch 15 is closed and the motor 33 starts, being actuated by a circuit which can be traced from power conductor 38A, over conductor 54, through closed switch contacts 39, through the upper limit cam switch contacts 45, to the motor capacitor 68 and the upper field winding 41. From this winding the circuit continues through closed contacts 28, and back to power conductor 38B. At this same time the clutch winding 60 is energized because the winding terminals are bridged across conductor 54 and one side of field winding 41. Clutch 34 is engaged and the cam shaft 35 is moved by motor 33.

Motor 33 continues to turn and moves the cam shaft through a reduction gearing (not shown in the drawing). The speed of the motor and the gear reducer are such that cam shaft 35 turns at the rate of one revolution every eight minutes. This speed has been found to give satisfactory results but the invention is not limited to any definite speed of operation. After five seconds the lower limit cam 36E closes contacts 44. The water in the container 17 at this time is cold and contacts 52 are still open.

After ten seconds of motor operation, contacts 46 are closed by cam 36A and relay winding 13A receives current through a circuit which may be traced from power conductor 38A, over conductor 54, through contacts 53 which are still closed, over conductor 51, through relay winding 13A, contacts 46, and back to power conductor 38B over conductor 70. The current through this circuit closes both contacts 55 and heater 18 is connected directly to the high voltage power conductor 38A and 38C. Heater 18 now heats the water flowing through conduit 17 and, if the amount of heat taken from the system is slow, the water in the conduit will reach the desired temperature, usually 190°, quickly and the thermo-element 30 will operate to open contacts 39 and stop motor 33 and the cam shaft. If the water is not hot enough contacts 39 remain closed and the motor continues to turn until, after 115 seconds, cam 36B closes contacts 47 and relay winding 13B is energized, closing contacts 56 and sending high voltage current to the second heater 20. Again, if this heating power is sufficient, to bring the fluid in the conduit up to the desired temperature the motor is stopped by the opening of contacts 39. If the heating effect of the combined heaters 18, 20 is not enough to produce the desired fluid temperature, the motor continues to turn and, after time intervals of 220 and 325 seconds, cams 36C and 36D close contacts 48 and 50, in sequential order. This action applies power to heaters 21 and 22 in the manner described above and adds their heat to those already energized.

If a large heat requirement in the system causes the activation of three heaters 18, 20 and 21, and is thereafter satisfied the fluid in conduit 17 may rise in temperature to a value in excess of the desired temperature. The thermo-element transducer 30 thereupon moves the actuator rod 71 so that contacts 39 are opened and contacts 52 are closed. This action sends current from conductor 54 through contacts 52 and closed contacts 44 to energize field winding 40 and start the motor 33 in the reverse direction. Contacts 50 will be the first to be opened normalizing relay 13D to cut off heater 22. If the water is still hotter than the desired temperature, contacts 52 remain closed and the motor continues to turn in the reversed direction until cam 36C opens contacts 48 and heater 21 is cut off. As soon as the fluid reaches the desired temperature, rod 71 is retracted by the transducer 30 to open contacts 52 and the reverse motion of the motor and cam shaft is stopped.

As long as the fluid is moving through the conduit 17, the flow switch contacts remain closed and voltage is applied to the common point between the two field windings allowing the motor to be turned in either direction depending upon which of the contacts 39 or 52 are closed. As soon as the fluid flow is stopped, contacts 28 are opened and current is cut off from the clutch winding 60, releasing the clutch. When this happens, the spring return device 61 returns the cams and cam shaft to the start position.

One of the fail-safe features includes the action of contacts 52, 53 shown as part of the thermal element switch 32. There may be times when a large flow of liquid requires the use of all four heaters. Then if the fluid flow is suddenly reduced by a considerable amount, the fluid temperature may rise above the desired value of 190°. Rod 71 is thereupon moved so that it opens contacts 53 (see FIGURE 8C). This action immediately cuts off all current to all relay windings and all the heaters are cut off. The motor still continues to rotate in the reverse direction and the cams open contacts 50, 48, 47 and 46 in sequence but the fast action of rod 71 and contacts 52 precede their action.

A second fail-safe feature resides in the action of the upper limit cam 36F. This cam normally holds contacts 45 closed throughout the normal rotation of the cam shaft. However, if any of the controls fail or for any other reason, motor 33 continues to turn after cam 36D switches in the fourth heater, then (after 30 seconds) cam 36F opens contacts 45 and the motor cannot move in the upward direction. It should be noted that the lower motor control circuit is still in operation and the motor can be moved in the reverse direction by the closing of contacts 52 to restore normal operation.

Contacts 52 are closed when the temperature exceeds the desired temperature by about 10° F. Contacts 53 are opened about 20° F., higher or about 30° F. above the desired temperature. There are many variations in this type of switch operation and several ways in which the combination may be illustrated schematically. It should also be noted that any type of reversible motor can be used for this application.

All the heaters are shown coupled through relays which control their operation. This has been done in order to make and break both sides of the supply line to the heaters rather than leave one side permanently connected. Also, a different supply voltage can be used for the heater units. It is obvious that the cams could accomplish the switching sequence without the use of relays.

It will be apparent from the foregoing that the use of a simple switch plus a make-before-break switch operated by the temperature sensitive transducer 30 makes possible a wide variety of control operations. The unit operates as a high limit control in that power to all relay switch coils is immediately interrupted when the transducer registers a high limit temperature. In addition the switches serve to change the direction of rotation of the motor 33 thereby adding or reducing the number of heating elements in operation within the conduit 17. This operation is continuous and in response to the amount of heat dissipated throughout the system so that the device constantly seeks to maintain the desired temperature. When the proper balance of applied heat to dissipated heat in the system is reached, the motor 33 stops and those heaters in operation remain energized. Any change in demand in the system thereafter will be sensed by the transducer 30 which in turn will actuate the switches to bring about a condition of balance.

Details of the flow switch have not been given because such devices are old in the art and have been described in the literature. Any type of flow switch which closes contacts when fluid flow is greater than a minimum value can be used.

From the above description and operation, it is evident that a novel form of instant fluid heater has been disclosed. It is entirely automatic in operation, possesses many safety features, and occupies very little space.

Having thus fully described the invention, what is claimed as new and desired to be secured by Letters Patent of the United States, is:

1. An automatic electrical fluid heating apparatus comprising, a conduit to receive the fluid therethrough, a plurality of electrical resistors within the conduit for heating the fluid as it flows through the conduit, a temperature sensitive transducer within the conduit for producing a mechanical movement proportional to the temperature of the fluid in the conduit, for maintaining the fluid temperature at a predetermined value, a reversible motor connected to a source of electrical power, a cam shaft, a magnetic clutch coupling the said cam shaft to the motor, a plurality of cams secured to the shaft a first set of electrical switching contacts responsive to the movement of the transducer for reversing the motor when the temperature rises above a predetermined value, a second set of normally open contacts operatively positioned with respect to the cams, means to couple the second contacts to the electrical resistors for sending current through the said resistors, said cams being arranged for sequential operation of the second set of contacts whereby the number of resistors receiving current is proportional to the angular movement of the shaft and switch means responsive to the flow of the fluid to deactivate the magnetic clutch and return the cams to a non-operating position by resilient means.

2. An automatic fluid heating apparatus as claimed in claim 1 wherein the second set of contacts is coupled to said resistors by means of relays.

3. An automatic fluid heating apparatus as claimed in claim 1 wherein an upper limit cam is also secured to the shaft, said upper limit cam being coupled to a pair of normally closed contacts which are connected in series with a motor field winding and which are opened after the motor shaft has turned through a predetermined angle.

4. An automatic fluid heating apparatus according to claim 1 in which the clutch deactivating means is a flow switch.

5. An automatic fluid heating apparatus according to claim 1 in which at least one make-before-break switch is included in the first set of electrical switching contacts.

References Cited by the Examiner

UNITED STATES PATENTS

| 1,920,284 | 8/1933 | Wells | 219—309 |
| 2,553,212 | 5/1951 | Rouis et al. | 219—321 |
| 2,700,505 | 1/1955 | Jackson | 219—493 X |
| 2,788,416 | 4/1957 | Kilbury | 219—493 X |
| 2,993,106 | 7/1961 | Mauldin et al. | 219—486 |
| 3,165,625 | 1/1965 | Potter | 219—486 X |

FOREIGN PATENTS 726,434  10/1942  Germany.

RICHARD M. WOOD, *Primary Examiner.*
ANTHONY BARTIS, *Examiner.*